United States Patent [19]
Kang et al.

[11] Patent Number: 5,948,460
[45] Date of Patent: Sep. 7, 1999

[54] FLAVORED PRODUCT ADDITIVE AND METHOD FOR USING SAME

[75] Inventors: Raphael K. L. Kang, Northvale, N.J.; Li Li Zyzak, Nanuet; Tetsuo Nakatsu, Chappaqua, both of N.Y.

[73] Assignees: Takasago International Corporation, Japan; Takasago Institute for Interdisciplinary Science, Inc., Rockleigh, N.J.

[21] Appl. No.: 09/123,033

[22] Filed: Jul. 27, 1998

[51] Int. Cl.[6] .............................. A23L 1/236; A23L 1/22; A23L 2/56
[52] U.S. Cl. ...................... 426/548; 426/534; 426/538; 426/590; 426/650
[58] Field of Search ................................. 426/534, 538, 426/548, 590, 650

[56] References Cited

U.S. PATENT DOCUMENTS

| | | |
|---|---|---|
| 5,380,540 | 1/1995 | Yamanaka et al. .................... 426/534 |
| 5,523,105 | 6/1996 | Ishikawa et al. ...................... 426/538 |

*Primary Examiner*—Keith D. Hendricks
*Attorney, Agent, or Firm*—Morrison Law Firm

[57] ABSTRACT

One or more compounds selected from among oleanolic acid, ursolic acid, and polygodial added to a flavored product to reduce an aftertaste in the product and enhance its sweetness. This flavored product additive is added to diet beverages and flavored products at an amount effective to reduce the aftertaste of the artificial sweetener and improve the sweet flavor. This amount is from 0.1 ppm to 1000 ppm with respect to the artificial sweetener. The present invention also includes a diet drink which contains polygodial, oleanolic acid, or ursolic acid at 0.001 ppb to 10 ppm with respect to the artificial sweetener, for improving or reducing an aftertaste from the artificial sweetener and also to improve the sweetness of the flavor.

23 Claims, No Drawings

FLAVORED PRODUCT ADDITIVE AND METHOD FOR USING SAME

BACKGROUND OF THE INVENTION

The present invention relates to a flavored product additive which improves the flavor of artificially sweetened products. More specifically, the present invention relates to an additive for use with artificial sweeteners which not only improves the metallic aftertaste of products flavored with artificial sweeteners, but also improves the sweet taste of the flavor. The present invention also relates to a method for making flavored products containing the flavored product additive.

Various additives are known to improve different desirable flavor characteristics. These include a flavor improvement method for food and beverages where at least one of the following is added: monomers and polymers of triosereductone, hydroxymalondialdehyde, and hydroxypyruvaldehyde (refer to U.S. Pat. No. 5,380,540, the entirety of which is hereby incorporated by reference). These compounds activate the original food flavors and thereby enhance the effect of, for example, saltiness in food.

Polygodial ([(1R-(1α,4aβ,8aα)-1,4,4a,5,6,7,8,8a-octahydro-5,5,8a-trimethyl-1,2-naphthalenedicarboxaldehyde) has been used as a spice from ancient times, due to its intense flavor. The chemical structure of polygodial is shown below in formula I:

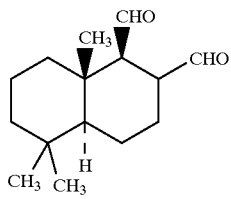

[I]

Polygodial is obtained from *Polygonum hydropiper* of the Polygonaceae, *Drimys lanceolata*, *Warburgia stublmanii*, and the like (Aust. J. Chem. 15: 389 (1962); Handbook for Foodstuff Fragrance, 1990, page 224 (issued by the Japanese Food Chemistry Newspaper)). Polygodial is widely distributed throughout the plant kingdom and has insect antifeedant properties. An extract of *Polygonum hydropiper* containing polygodial is used as a preservative for miso (soybean paste) (see Japanese Laid-Open Patent Number 3-259058). Furthermore, it has been reported that polygodial creates a synergistic antibacterial action with other antibacterial agents (J. Agric. Food Chem. 40: 2328 (1992)). Polygodial has also been shown to improve the flavor and odor of mint seasoning. Polygodial is thought to improve mint flavor or odor in a number of ways—it intensifies the coolness feeling, reduces the bitterness, and enhances the duration of mint flavor and odor. As a result, polygodial has been adopted for use in mint-flavored foods and drinks (especially candy and chewing gum), as well as cosmetics, toothpaste, and pharmaceuticals (refer to Japanese Laid-Open Patent Application No. 7-145398).

Oleanolic acid ((3β)-3-hydroxyolean-12-en-28-oic acid) is a naturally occurring compound present in olive leaves, apple peel, and clove buds. As a saponin, it is contained in many plants, such as sugar beet. The structure of oleanolic acid is shown below in formula II:

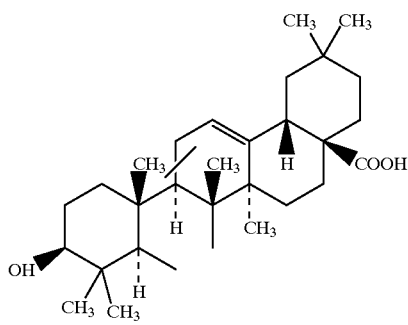

[II]

Ursolic acid ((3β)-3-hydroxyurs-12-en-28-oic acid) is found as a waxy substance on fruits and leaves of many plants, such as bearberry, apple, cherries, prunes, pears, and the like. The structure of ursolic acid is shown below in formula III:

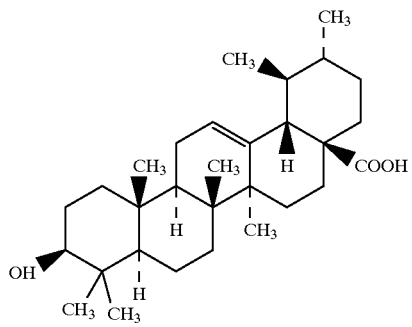

[III]

Ursolic acid is useful as a emulsifying agent in foods and pharmaceuticals, and also has diuretic properties.

Sweeteners are added to increase the palatability of foods, drinks, and the like. Sucrose and other sugars are the most widely used sweeteners for this purpose. However, the increased intake of sugars has increased the problems of obesity in the general population. As a result, products such as diet foods and drinks have appeared. These include both natural and artificial sweeteners having reduced calories.

The artificial low calorie sweeteners often leave a bitter or unpleasant aftertaste in the mouth after use. The widely used artificial sweeteners aspartame, acesulfame K and saccharine are particularly well known for a bitter metallic after taste. As a result, a food and beverage supplement which can improve the aftertaste of artificial sweeteners is desirable.

OBJECTS AND SUMMARY OF THE INVENTION

It is an object of the present invention to provide a compound which improves the aftertaste of artificial sweeteners in flavored products such as diet beverages, personal hygiene products (such as toothpaste) and foods.

It is another object of the present invention to provide a compound which improves the sweetness of artificially sweetened products such as diet beverages, personal hygiene products and foods.

It is another object of the present invention to provide a method for using the compound of the invention to improve the flavor of artificially sweetened products.

It is another object of the present invention to provide a diet drink that includes an additive for improving the aftertaste of an artificial sweetener in the diet drink.

It is another object of the present invention to provide a diet drink that includes an additive for improving the sweet taste of the diet drink.

Briefly stated, one or more compounds selected from among oleanolic acid, ursolic acid, and polygodial, added to a beverage containing an artificial sweetener, reduces an aftertaste in the beverage and improves its sweetness. This flavored product additive is added to flavored products at an amount effective to improve sweetness of the flavored product. This amount is from 0.1 ppm to 1000 ppm with respect to the artificial sweetener. The flavored product additive is also added to flavored products at an amount effective to reduce the metallic aftertaste of artificial sweeteners. This amount is from 0.1 ppm to 1000 ppm with respect to the artificial sweetener. The present invention also includes a diet drink which contains polygodial, oleanolic acid, or ursolic acid at 0.001 ppb to 10 ppm with respect to the diet drink for improving the sweetness of the drink and reducing an aftertaste from an artificial sweetener.

According to an embodiment of the present invention, a flavored product additive comprises a mixture of an artificial sweetener and an effective amount of at least one member selected from the group consisting of polygodial, oleanolic acid, and ursolic acid, the effective amount being effective to reduce a metallic aftertaste and to improve sweetness.

According to another embodiment of the present invention, a method for reducing a metallic aftertaste in a flavored product containing an artificial sweetener comprises the step of adding at least one member selected from the group consisting of polygodial, oleanolic acid, and ursolic acid in an amount effective to reduce the metallic aftertaste and to improve sweetness.

According to another embodiment of the present invention, a diet beverage containing an artificial sweetener comprises at least one member selected from the group consisting of polygodial, oleanolic acid, and ursolic acid in an amount effective to reduce a metallic aftertaste of the artificial sweetener and improve sweetness.

The above, and other objects, features and advantages of the present invention will become apparent from the following description.

DETAILED DESCRIPTION OF THE PREFERRED EMBODIMENT

In order to solve the problems described above, the present inventors studied the effect of additives which have the possibility of diminishing the metallic aftertaste of flavored products having artificial sweeteners. Among the broad range of additives studied, oleanolic acid, ursolic acid, polygodial, and plant extracts having a high content of these compounds were found to substantially improve the aftertaste of flavored products and particularly beverage products having artificial sweeteners. The inventors also discovered these compounds improved the sweetness of artificially sweetened flavored products. The additives of the present invention are not limited to use in food and beverage products, but may be used with any product that includes artificial sweeteners, including, for example, toothpastes and sweetened lozenges.

Oleanolic acid may be obtained as a saponin from a natural source, such as sugar beet. Ursolic acid can be isolated from a natural source, such as bearberry as described above.

Polygodial may be isolated from, among other sources, *Polygonum hydropiper, Drimys lanceolata,* and *Warburgia stublmanii*. The method for extracting polygodial from these plants is described in an article by Barnes et al (Aust. J. Chemistry, 15: 322 (1962)). Polygodial is obtained by first extracting a dried powder of the above plants with petroleum ether, and further extracting with methanol. The crude extract is further purified by liquid chromatography, and a crystalline form of polygodial is obtained.

For the method of adding the compounds of the present invention to an artificial sweetener, oleanolic acid, ursolic acid, and polygodial may be added as a purified product, as a crude extract from plants which contain these, or as a mixture of the two. The extracted oil of these plants can be diluted in a constant volume of an organic solvent which is approved for use in food products, such as ethanol or the like. Alternatively, the extract or purified additive may be made into a Captex™ suspension and added to the sweetener. The amount required to improve the aftertaste and sweetness of the artificial sweetener depends on the type and amount of sweetener. Generally, this amount is between about 0.1 ppm and about 1000 ppm with respect to the artificial sweetener. A preferred amount is between about 0.5 ppm and about 500 ppm, and a more preferred amount is between about 1 ppm and about 200 ppm. The components of the present invention, oleanolic acid, ursolic acid, and polygodial, can be added to the flavored products such as food, beverages, toothpaste, or the like at the final stages of preparation.

The above, and other objects, features and advantages of the present invention will become apparent from the following descriptions.

DETAILED DESCRIPTION OF THE PREFERRED EMBODIMENTS

Experiment 1

Oleanolic acid (from Aldrich Chemical Co.) was dissolved in ethanol to its approximate saturation point. Samples of a commercially available carbonated diet beverage (diet beverage 1) containing 0, 1.0, 2.5, and 5.0 ppm added oleanolic acid were prepared. Diet beverage 1 contained aspartame as an artificial sweetener. Nine panel members assessed the sweetness of the samples. 1.0 ppm of the additive was selected for further characterization, because all the panelists responded favorably to this concentration, and six members chose it as the best concentration.

Experiment 2

Oleanolic acid (from Aldrich Chemical Co.),and ursolic acid (from Aldrich Chemical Co.) were dissolved in small volumes of ethanol. Crude polygodial, prepared as described above, was dissolved in Captex™. Test samples were prepared by adding each to diet beverage 1 to a final concentration of 1.0 ppm. The test samples prepared as above were compared to diet beverage 1 containing no additives by a panel members of eight members. The results are shown in Table 1.

Key to Tables

Subjective Rating Scale

"−" means no discernable effect

"±" means equal distribution of no discernable effect and desirable effect

"+ to +++" is a range of increasingly more desirable effect

TABLE 1

| Additive | Sweetness | Reduction in Aftertaste | Comments |
| --- | --- | --- | --- |
| No additive | ± | ± | — |
| Oleanolic acid | ± | + | — |
| Ursolic acid | + | +++ | Change in feeling in the mouth |
| Polygodial | ± | ++ | Greatest removal of metallic taste |

Experiment 3

Oleanolic acid (from Aldrich Chemical Co.) and ursolic acid (from Aldrich Chemical Co.) were dissolved in small volumes of ethanol. Crude polygodial, prepared as described above, was dissolved in Captex™. Test samples were prepared containing the test compounds at concentrations of 0.1 ppb and 1.0 ppb in a second commercially available carbonated diet beverage (diet beverage 2. The diet beverage contained Aspartame and Acesulfame K as the sweeteners. The test samples were compared to diet beverage 2 with no additives. The results are shown in Table 2.

TABLE 2

| Additive | Amount added (ppb) | Increase in Sweetness | Reduction in metallic aftertaste |
| --- | --- | --- | --- |
| No additive | — | ± | ± |
| Oleanolic acid | 0.1 | + | ± |
|  | 1.0 | +++ | + |
| Ursolic acid | 0.1 | +++ | + |
|  | 1.0 | ++ | + |
| Polygodial | 0.1 | ++ | ± |
|  | 1.0 | ++ | ± |

As indicated in Table 2, all of the panelists judged that, compared with the control, adding the above substances made the aftertaste of diet beverage 2 more palatable, in all cases.

Experiment 4

Polygodial was prepared as described above and dissolved in water. The prepared polygodial was added to diet beverage 2 at concentrations of 1.0 ppb, 10.0 ppb, 0.1 ppm, and 1.0 ppm. A functional test was conducted comparing the test samples to diet beverage with no additives. The results are shown in Table 3.

TABLE 3

| Amount Added (ppb) | Sweetness | Reduction in Aftertaste |
| --- | --- | --- |
| No additive | 0/10 | 0/9 |
| 1 | 2/10 | 3/9 |
| 10 | 5/10 | 9/9 |
| 100 | 9/10 | — |
| 1,000 | 10/10 | 6/8 |

As shown in Table 3, the addition of polygodial to diet beverage 2 resulted in enhanced sweetness at all concentrations studied. Furthermore, most panelists detected a reduction in unpleasant aftertaste at 10 ppb and above.

Having described preferred embodiments of the invention, it is to be understood that the invention is not limited to those precise embodiments, and that various changes and modifications may be effected therein by one skilled in the art without departing from the scope or spirit of the invention as defined in the appended claims.

What is claimed is:

1. A flavored product additive comprising:

a mixture of an artificial sweetener and at least one member selected from the group consisting of polygodial, oleanolic acid, and ursolic acid.

2. A flavored product additive comprising:

a mixture of an artificial sweetener and at least one member selected from the group consisting of polygodial, oelanolic acid and ursolic acid in a amount effective to reduce a metallic aftertaste.

3. A flavored product additive according to claim 2, wherein said effective amount is between about 0.1 ppm and about 1,000 ppm with respect to said artificial sweetener.

4. A flavored product additive according to claim 2, wherein said effective amount is between 0.5 ppm and 500 ppm with respect to said artificial sweetener.

5. A flavored product additive according to claim 2, wherein said effective amount is between 1 ppm and 200 ppm with respect to said artificial sweetener.

6. A flavored product additive comprising:

a mixture of an artificial sweetener and at least one member selected from the group consisting of polygodial, oelanolic acid and ursolic acid in a amount effective to improve sweetness.

7. A flavored product additive according to claim 6, wherein said effective amount is between about 0.1 ppm and about 1,000 ppm with respect to said artificial sweetener.

8. A flavored product additive according to claim 6, wherein said effective amount is between 0.5 ppm and 500 ppm with respect to said artificial sweetener.

9. A flavored product additive according to claim 6, wherein said effective amount is between 1 ppm and 200 ppm with respect to said artificial sweetener.

10. A method for reducing a metallic aftertaste in a flavored product containing an artificial sweetener, comprising the step of adding to said flavored product at least one member selected from the group consisting of polygodial, oleanolic acid, and ursolic acid in an amount effective to reduce said metallic aftertaste.

11. A method for reducing a metallic aftertaste in a flavored product according to claim 10, wherein said amount is between 0.1 ppm and 1,000 ppm with respect to said artificial sweetener.

12. A method for reducing a metallic aftertaste in a flavored product according to claim 10, wherein said amount is between 0.5 ppm and 500 ppm with respect to said artificial sweetener.

13. A method for reducing a metallic aftertaste in a flavored product according to claim 10, wherein said amount is between 1 ppm and 200 ppm with respect to said artificial sweetener.

14. A method for improving sweetness in a flavored product containing an artificial sweetener, comprising the step of adding to said flavored product at least one member selected from the group consisting of polygodial, oleanolic acid, and ursolic acid in an amount effective to improve said sweetness.

15. A method for improving sweetness in a flavored product according to claim 10, wherein said amount is between 0.1 ppm and 1,000 ppm with respect to said artificial sweetener.

16. A method for improving sweetness in a flavored product according to claim 10, wherein said amount is between 0.5 ppm and 500 ppm with respect to said artificial sweetener.

17. A method for improving sweetness in a flavored product according to claim 10, wherein said amount is between 1 ppm and 200 ppm with respect to said artificial sweetener.

18. A diet beverage containing an artificial sweetener, comprising at least one member selected from the group consisting of polygodial, oleanolic acid, and ursolic acid in an amount effective to reduce a metallic aftertaste of said diet beverage.

19. A diet beverage containing an artificial sweetener, comprising at least one member selected from the group consisting of polygodial, oleanolic acid, and ursolic acid in an amount effective to improve sweetness of said diet beverage.

20. A diet beverage containing an artificial sweetener according to claim 18 or 19 wherein said amount is between 0.1 ppm and 1,000 ppm with respect to said artificial sweetener.

21. A diet beverage containing an artificial sweetener according to claim 18 or 19, wherein said amount is between 0.5 ppm and 500 ppm with respect to said artificial sweetener.

22. A diet beverage containing an artificial sweetener according to claim 18 or 19, wherein said amount is between 1 ppm and 200 ppm with respect to said artificial sweetener.

23. A diet beverage containing an artificial sweetener according to claim 18 or 19, wherein said amount is between 0.001 ppb and 10 ppm with respect to said beverage.

* * * * *